(12) United States Patent
Zhao et al.

(10) Patent No.: US 8,144,923 B2
(45) Date of Patent: Mar. 27, 2012

(54) WATERMARKING ENCODED CONTENT

(75) Inventors: Jian Zhao, Valencia, CA (US); Eckhard Koch, Marl-Polsum (DE)

(73) Assignee: Thomson Licensing, Boulogne Billancourt (FR)

( * ) Notice: Subject to any disclaimer, the term of this patent is extended or adjusted under 35 U.S.C. 154(b) by 847 days.

(21) Appl. No.: 12/085,253

(22) PCT Filed: Dec. 5, 2005

(86) PCT No.: PCT/US2005/043895
§ 371 (c)(1),
(2), (4) Date: May 20, 2008

(87) PCT Pub. No.: WO2007/067168
PCT Pub. Date: Jun. 14, 2007

(65) Prior Publication Data
US 2009/0080689 A1    Mar. 26, 2009

(51) Int. Cl.
*G06K 9/00* (2006.01)
*G06K 9/36* (2006.01)

(52) U.S. Cl. ........................... 382/100; 382/232

(58) Field of Classification Search .................. 382/100, 382/135, 232, 240; 713/168, 173; 726/26; 380/28, 201, 243; 341/50–51, 65, 67, 106–107; 375/240, 240.19, 240.2, 240.26
See application file for complete search history.

(56) References Cited

U.S. PATENT DOCUMENTS

| | | | |
|---|---|---|---|
| 6,359,985 B1 | 3/2002 | Koch et al. | |
| 6,373,960 B1 | 4/2002 | Conover et al. | |
| 6,621,933 B2 | 9/2003 | Chung et al. | |
| 6,687,384 B1 | 2/2004 | Isnardi | |
| 6,711,276 B1 | 3/2004 | Yoshiura et al. | |
| 7,181,044 B2 | 2/2007 | Watson et al. | |

(Continued)

FOREIGN PATENT DOCUMENTS

JP    2005533410 A    11/2005
(Continued)

OTHER PUBLICATIONS

Liu, Zheng et al.: "Direct Fingerprinting on Multicasting Compressed Video", Jan. 12, 2005, pp. 76-83, XP010765640.
(Continued)

*Primary Examiner* — Samir Ahmed
*Assistant Examiner* — Mehdi Rashidian
(74) *Attorney, Agent, or Firm* — Robert D. Shedd; Jeffrey M. Navon; Shan He

(57) ABSTRACT

A system and method are described for inserting a watermark in encoded content, including receiving encoded content, receiving at least one pre-processed watermark unit and replacing directly a number of bits starting at a position in the encoded content with an alternative value, wherein the alternative value has embedded therein watermark signals, wherein the alternative value is selected from among a plurality of alternative values specified in the at least one said watermark unit. An apparatus and method for generating watermark units are also described including selecting a position where a value in encoded content is to be replaced by an alternative value and calculating a plurality of alternative values for each selected position. Further a system and method for replacing a watermark in encoded content are also described including receiving encoded content, receiving at least one pre-processed watermark unit and replacing a number of bits starting at a position in the encoded content with a value, wherein the value is specified in the at least one watermark unit.

29 Claims, 2 Drawing Sheets

U.S. PATENT DOCUMENTS

| | | | |
|---|---|---|---|
| 7,248,190 B2* | 7/2007 | Kadono et al. | 341/67 |
| 7,334,129 B1 | 2/2008 | Kamperman et al. | |
| 7,386,146 B2* | 6/2008 | Le Floch | 382/100 |
| 7,779,271 B2* | 8/2010 | Langelaar | 713/189 |
| 2002/0085737 A1 | 7/2002 | Kitamura | |
| 2003/0191941 A1 | 10/2003 | Terada et al. | |
| 2005/0044374 A1 | 2/2005 | Kesal et al. | |
| 2007/0079381 A1* | 4/2007 | Hartung et al. | 726/26 |
| 2007/0143617 A1* | 6/2007 | Farber et al. | 713/176 |

FOREIGN PATENT DOCUMENTS

| | | |
|---|---|---|
| RU | 2219582 C2 | 12/2003 |
| RU | 2251819 C2 | 5/2005 |
| TW | 532039 | 5/2003 |
| WO | 03003746 A1 | 1/2003 |

OTHER PUBLICATIONS

Liu, Hung-Hsun et al.: "Real Time Digital Video Watermarking for Digital Rights Management Via Modification of VLCS", Jul. 20, 2005, pp. 295-299, XP010852832.

Shuozhong Wang et al, Image Watermarking Using Dither Modulation in Dual-Transformed Domain, Journal of the Imaging Society of Japan 41 (4) 2002.

Deepa Kundar, Multiresolution Digital Watermarking Algorithms and Implications for Multimedia Signals, University of Toronto 1999.

* cited by examiner

WATERMARKING ENCODED CONTENT

This application claims the benefit, under 35 U.S.C. §365 of International Application PCT/US2005/043895 filed Dec. 5, 2005 which was published in accordance with PCT Article 21(2) on Jun. 14, 2007 in English.

FIELD OF THE INVENTION

The present invention relates to digital watermarking and specifically, to embedding, removing/replacing and detecting digital watermarks in encoded content.

BACKGROUND OF THE INVENTION

Encoded content requires a "decoding" process in order to use the content. Some examples of encoded content include MPEG-1 MPEG-2 H264/AVC, WMA, MPEG4, JPEG2000, MP3, PDF, Windows Word, Postscript, etc, and their encrypted versions.

One prior art method for watermarking encoded content is to insert watermark signals in the structure and syntax elements. U.S. Pat. No. 6,687,384 is an example for embedding data in syntax elements in a coded bit stream such as MPEG-1 and MPEG-2. Such watermarks do not, however, survive format change or digital-analog conversion.

Another prior art method for watermarking encoded content is to embed a watermark by adding noise to the DCT coefficients for MPEG encoded content. An example of this approach is described by F. Hartung and B. Girod in "Digital Watermarking of MPEG-2 Coded Video in the Bit Stream Domain", Proc. IEEE ICASSP, pp. 2621-4, April 1997. The method of Hartung and Girod does not use perceptual techniques.

Yet another prior art method for watermarking encoded content is to directly modify the encoded content. U.S. Pat. No. 6,373,960, hereinafter "Conover", describes a watermarking method within an MPEG compressed video bit stream by modifying some DCT coefficient in such a way that the entropy encoded length of these coefficients remain unchanged after modification. No specific watermark embedding methods are specified in Conover. The methods for selecting watermark sites in Conover are limited to the coefficients with 0 run-zero. The coefficients of Conover are in the high frequency domain. The method of Conover includes no preprocessing phase nor is there any "alternative value" for actual watermark insertion in the later phase described. The concept of generating and using "watermark units" is nowhere disclosed or taught in Conover.

The prior art methods for watermarking encoded content does not have a pre-processor for producing "alternative values" for some parts of the encoded content. The prior art methods for watermarking encoded content exclude encoded content that is further masked, obfuscated, scrambled or encrypted (collectively "encrypted").

SUMMARY OF THE INVENTION

The present invention watermarks encoded content by embedding watermarks in selected locations in the encoded content. This is accomplished by replacing original values in the encoded content by their alternative values. Each original value may have one or more alternative values and each alternative value contains a watermark signal. Moreover, watermarks can be removed by replacing the alternative values with the original value, or by substituting one alternative value with another alternative value.

By selecting one of the alternative values to substitute for the original value in the corresponding locations in the encoded content, the following goals are fulfilled:

The alternative values are identical in size to the original value, and replacement by any one of the alternative values creates an encoded content compliant with a defined format and does not introduce perceptual artifacts in the encoded content.

The alternative values may improve the quality of the encoded content. For example, the original value may or may not be a valid value. In other words, without the replacement by one of its alternative values, the encoded content may not be a legitimate format. In another case where the original value is a valid value, without the replacement by the alternative value, the original value may introduce the degradation of the encoded content.

Each alternative value contains watermark signals. These watermark signals, either together with other watermark signals at other positions within the encoded content or by themselves, can have one or more units of information embedded. A unit of information consists of one or more bits.

The data volume of the alternative values (defined by the data size per alternative value and the number of alternative values) must be small, compared to the data volume of encoded content.

One important goal of directly watermarking encrypted content is "localized encryption". A localized encryption allows for a correspondence between the clear text and cipher text. For example, a unit of clear text includes components c1, c2, ... cn. After localized encryption, the cipher text consists of c1', c2', ..., cn' where ci' is the encrypted version of ci ($1 \leq i \leq n$). A simple example of localized encryption is to split the content into parts and encrypt each part separately. For example, in an extreme case, each coefficient or group of coefficients is encrypted separately. One category of encryption, which makes localized encryption possible, is selective encryption or partial encryption. Instead of treating content (audio or video) as binary data streams (also called "native encryption"), selective encryption methods "understand" the content syntax structure (e.g. MPEG-2 structure) and only selectively encrypt some parts of the content. Selective encryption occurs after compression. Encrypted content must not have commercial value, although part of content may be visible. Some selective encryption schemes may preserve the format, bit rate, and size of the encoded content that is not selectively encrypted. Other selective encryption schemes may increase bit rate or require a special decoder.

Taking MPEG-2 content as an example, a simple selective algorithm encrypts only the I-frames. The selectively encrypted MPEG may be a valid MPEG stream. Although P and B frames in MPEG-2 are not valuable without knowledge of the corresponding I frames, large portions of MPEG video are still visible because of inter-frame correlation and mainly from unencrypted I-blocks in the P and B frames. Other selective encryption schemes include encryption of MPEG-2 headers and/or encryption of DCT coefficients. The DCT coefficients are divided into "DC coefficient" and "AC coefficients". DC coefficients are the coefficients with zero frequency in both dimensions, and AC coefficients are the remaining coefficients with non-zero frequencies. All DC coefficients or partial values of AC coefficients of all I-blocks can be encrypted.

A system and method for inserting a watermark in encoded content are described including receiving encoded content, receiving at least one watermark unit and replacing directly a number of bits starting at a position with an alternative value, wherein the alternative value has embedded therein watermark signals. A apparatus and method for generating watermark units are also described including selecting a position where a value in encoded content is to be replaced by an alternative value and calculating the alternative value. Further a system and method for replacing a watermark in encoded content are also described including receiving encoded content, receiving at least one watermark unit and replacing a number of bits starting at a position in the encoded content with a value, wherein the value is specified in the at least one watermark unit and further wherein the position is specified in the at least one watermark unit.

Further a system and method for inserting a watermark in encoded content are described including receiving encoded content, receiving at least one watermark unit, receiving a sequence of bits, wherein the sequence of bits comprises watermark payload information and performing one of replacing directly a number of bits starting at a position with an alternative value and leaving unchanged the number of bits starting at the position based on bit values of the sequence of bits of the watermark payload information and wherein the alternative value has embedded therein watermark signals. A system and method for watermark detection are also described including receiving at least one watermark unit, receiving watermarked content, retrieving a plurality of coefficient values from the watermarked content and retrieving bit values of the watermark from the coefficient values.

BRIEF DESCRIPTION OF THE DRAWINGS

The present invention is best understood from the following detailed description when read in conjunction with the accompanying drawings. The drawings include the following figures briefly described below.

DETAILED DESCRIPTION OF THE PREFERRED EMBODIMENTS

Figure 1:
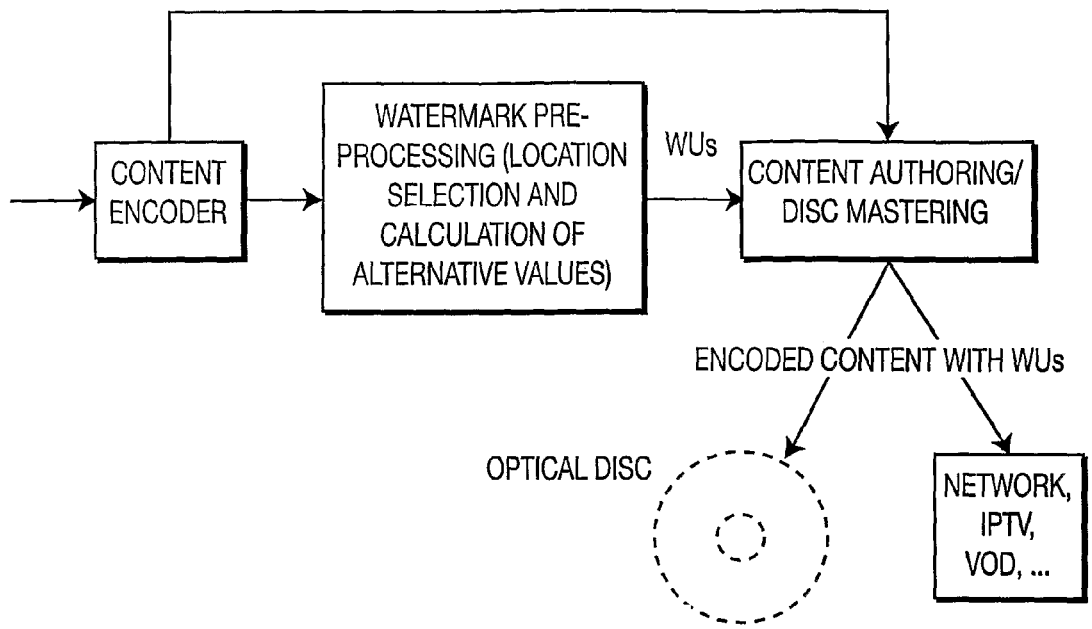
FIG. 1 is a block diagram showing the workflow for the pre-processing for watermark embedding in accordance with the principles of the present invention.

Watermarking encoded content can be divided into three separate steps:
  Location selection, which is the selection of the position where the value in the encoded content can be replaced by alternative values containing watermark signals.
  Calculation of alternative values, which is the determination of the alternative values so that the alternative values have the same number of bits as the value the alternative values are to replace in the encoded content and such substitution will not cause perceptual changes to the content. Moreover, these alternative values contain watermark signals.
  Watermark embedding/insertion, which is the actual replacement of the value in the encoded content by one of the alternative values.

The first two steps can be pre-processed. As a result of the pre-processing, a set of watermark units (WUs) are produced. WUs contain all information for actually embedding/inserting a watermark. The watermark pre-processor takes encoded content as the input and a watermark key, and outputs a sequence of watermark units. In the case where only one alternative value is generated for each WU, a watermark payload may become an additional input to the pre-processor. These watermark units are integrated into the final content as meta data of the encoded content, as a separate channel multiplexed with the content, as steganographic data hidden in the syntax elements or in the content, or as a separate file stored in the physical media (optical disc, tape, hard drive, etc.) or transmitted over a network (TCP/IP, satellite, etc.).

The watermark payload information is embedded by selecting from among the alternative values in WUs. A WU has at least one alternative value. When each WU has only one alternative value, there are two methods to embed/insert the watermark information (payload). The first method is to embed single fixed watermark payload by replacing all original values in WUs by their alternative values. The second method allows for embedding various watermark payloads by switching between replacement or non-replacement for WUs. For example, a replacement indicates a positive bit value and non-replacement for the negative bit value. To embed a watermark payload '00101001", the original values in the first and second WU are not replaced, the original value in the third WU is replaced by its alternative value. For a WU with more than one alternative value, each alternative value, which contains a watermark signal that may represent a different information unit of watermark payload. The alternative value is selected for substitution based on the watermark payload. For example, to embed one bit in a WU, only two alternative values V1 and V2 are required. To embed a bit value '0', V1 is selected to replace the original value in the encoded content, and to embed a bit value '1', V2 is selected. With two values V1 and V2 it is possible to express a '0'- and a '1'-bit. If there are four alternative values (V1, V2, V3 and V4) two bits information (i.e. '00', '01', '10' and '11') can be embedded. With more alternative values at one position, more bits can be embedded, which allows for a very efficient embedding of information.

The watermark payload is typically received in the third step "Watermark Insertion". It can be stored in or calculated by a component external to the watermarking system. The watermark payload information is typically an identifier uniquely identifying the recipient, playback device (manufacturer, model and/or serial number), or date and time of the playback of the content. The difference between the original value, V, and its alternative values may be stored in WUs to potentially reduce the size of WUs. WUs can be further compressed.

It is important that the WUs are protected against unauthorized access or modification, because with this information not only the watermarking system is vulnerable to various attacks but also it is easy for a hacker to insert fake watermarks, or alter or remove existing watermarks. If the WUs are stored and transmitted as steganographic (watermarking) data, the access can be controlled by a watermarking key. If the WUs are stored and transmitted over any another channel, it requires encryption of the WUs.

As indicated earlier, the first and second steps can be performed as a pre-processing. Thus, prior to the third step the encoded content is not watermarked. The third step performs the watermark embedding by replacing some values in the encoded content with the alternative values specified in WUs. These values can be encoded syntax elements such as package identification, headers, quantization table, Huffman table for entropy coding, encoded coefficients or encoded motion vectors. The WUs specify where the watermark signals (in alternative values) are embedded and what the possible watermark signals can be in these positions by selecting the appropriate alternative values.

Figure 2:
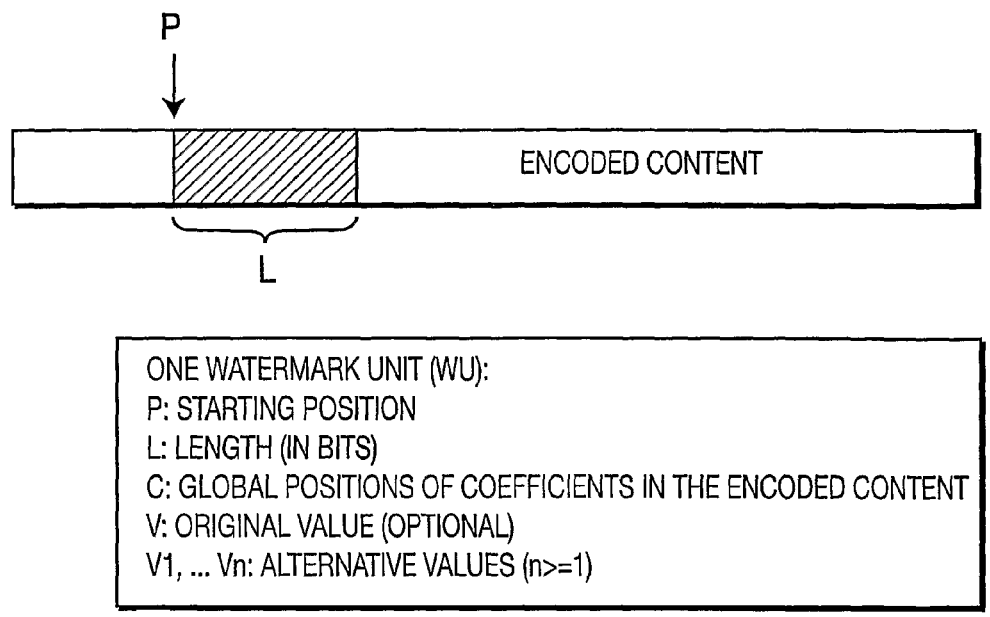
FIG. 2 depicts a watermark unit (U) of the present invention.

FIG. 1 is a block diagram showing the workflow for pre-processing of encoded content to generate WUs. FIG. 2 depicts a watermark unit in accordance with the principles of the present invention. Each WU is described by a vector (P, L, C, {V}, V1, V2, . . . Vn) where P is the position of the original value V that may be replaced in the future by an alternative value in the encoded content, L is the number of bits occupied by the original value V in the encoded content starting at P, C is a set of global positions of the coefficients (for example, the DCT or wavelet quantized coefficients) that are encoded in the L bits (in encoded content) with an entropy coding method. Entropy coding such as a Huffman coding is typically applied to the last stage of encoding to produce the encoded content. V1, V2, . . . Vn are valid alternative values of V and each of such values contain a watermark signal. Each coefficient position is represented by c(ch, f, b, co) where ch is the channel index, f is the frame index, b is the block index, and co is the coefficient index within the block for a unit of video content. An alternative value is valid, if, when this value replaces the current value it maintains format compliance and there are no perceptual effects on the content. Moreover, V1, V2, . . . Vn occupy L bits as V does in the encoded content. {V} indicates that the original value is optional in the embedding/insertion process. The original value may be required in the watermark removal processes.

An original value V may contain one or more coefficients in encoded form. When the WUs are generated, if the input is encoded content such as MPEG-2 or MPEG-4, the entropy coding, i.e. Variable Length Coding (VLC), first needs to be "undone" to access to coefficients, and then find the appropriate position and alternative values and store the original coefficient and these alternative values. An alternative value Vi may correspond to the same coefficients as V does, but in some cases Vi may correspond to more or less coefficients than V does.

A typical 8×8 block of quantized DCT coefficients in MPEG-2 is shown below. Most of the higher order coefficients have been quantized to 0.

| 12 | 34 | 0 | 2 | 0 | 0 | 0 | 0 |
| 87 | 0  | 0 | 1 | 0 | 0 | 0 | 0 |
| 16 | 0  | 0 | 0 | 0 | 0 | 0 | 0 |
| 0  | 0  | 0 | 0 | 0 | 0 | 0 | 0 |
| 0  | 0  | 0 | 0 | 0 | 0 | 0 | 0 |
| 0  | 0  | 0 | 0 | 0 | 0 | 0 | 0 |
| 0  | 0  | 0 | 0 | 0 | 0 | 0 | 0 |
| 0  | 0  | 0 | 0 | 0 | 0 | 0 | 0 |

After zig-zag scanning the sequence of DCT coefficients to be transmitted looks like:

12 34 87 16 0 0 2 0 0 0 0 0 1 0 0 0 0 0 0 . . .

The first DCT coefficient (12) is sent via a separate Huffman table. After Run-Level parsing, the remaining coefficients and associated runs of zeros are:

34 | 87 | 16 | 0 0 2 | 0 0 0 0 0 1 | 0 0 0 0 0 0 . . .

Using the DCT Coefficients Table Zero listed below and specified in MPEG-2 standard, these coefficients are encoded into 6 Variable Length Codes (VLC) as follows (in binary bit representation):

0000 0100 0010 0010 | 0000 0100 0000 0000 0101 0111 | 0000 0000 0111 110 | 0000 1000 | 0001 010 110 | 10

MPEG-2 DCT Coefficients Table Zero (Part)

| Variable length code (VLC) | Run | Level |
|---|---|---|
| 10 | End of Block | |
| . . . | . . . | . . . |
| 0001 10 s | 1 | 2 |
| 0001 11 s | 5 | 1 |
| 0001 01 s | 6 | 1 |
| 0001 00 s | 7 | 1 |
| . . . | . . . | . . . |
| 0000 100 s | 2 | 2 |
| . . . | . . . | . . . |
| 0000 01 | Escape | |
| . . . | . . . | . . . |
| 0000 0000 0111 11 s | 0 | 16 |
| . . . | . . . | . . . |

(note: the last bit 's' in each VLC above indicate the sign of the level: '0' for positive and '1' for negative value)

MPEG2 Encoding of Run and Level Following an ESCAPE Code

| Fixed length code | Run | Fixed length code | signed_level |
|---|---|---|---|
| 0000 00 | 0 | 1000 0000 0000 | reserved |
| 0000 01 | 1 | 1000 0000 0001 | −2047 |
| 0000 10 | 2 | 1000 0000 0010 | −2046 |
| . . . | . . . | . . . | . . . |
| | | 1111 1111 1111 | −1 |
| . . . | . . . | 0000 0000 0000 | Forbidden |
| . . . | . . . | 0000 0000 0001 | +1 |
| . . . | . . . | . . . | . . . |
| 1111 11 | 63 | 0111 1111 1111 | +2047 |

For ease of reading, the above VLC (also called entropy codes) are separated by a "|". The first and second DCT coefficients use a fixed length code to encode Run and Level according to the table "MPEG2 Encoding of run and level following an ESCAPE code", and the remaining DCT coefficients are coded according to "MPEG-2 DCT Coefficients Table zero". The last VLC is a special "End of Block" code indicating the remaining coefficients in the block are 0.

An alternative value can be any part of the above encoded bits. For example, one alternative value may consist of part of VLC, one or more consecutive VLCs, or one VLC plus part of next VLC.

In the following example of WU, an alternative value consists of one VLC, which is the 5$^{th}$ VLC:

(P0+63, 7, C, 0001010, 0001110, 0001100, 0001000)

Each element in this WU is explained as follows:

P0 is the starting position of this block in the encoded content. "63" the relative position (in bits) to the beginning of this block, 7 indicates a length L, C consists of 7 coefficients as follows:

c(f, ch, b, 7), c(f, ch, b, 8), . . . c(f, ch, b, 13) where f is the current frame index, ch is the current channel index and b is the current block index of this block in the example. The size of the alternative value is 7 bits, i.e. L=7.

0001010 is the original value (V), there are three alternative values: 0001110 (V1), 0001100 (V2), and 0001000 (V3). These alternative values are coded as the following Run and Level values (refer to MPEG2 DCT coefficients Table zero), respectively:

0001110: Run=5, Level=1
0001100: Run=1, Level=2
0001000: Run=7, Level=1

A Run (R) and Level (L) pair represents a sequence of numbers beginning with R zeros followed by L. For example, a Run-Level pair (5, 3), i.e. Run=5 and Level=3, represents 0 0 0 0 0 3. Thus, the alternative values above represent the following coefficients before entropy coding:

0 0 0 0 0 1 0 (Run=5, level=1)
0 2 (Run=1, Level=2)
0 0 0 0 0 0 0 1 (Run=7, Level=1)

Because the $5^{th}$ VLC is the last VLC coding non-zero coefficients in this block, the alternative values do not necessarily correspond to the same coefficients coded by V. In case of V2 and V3, instead of coding seven coefficients in V1, V2 encodes only 2 coefficients and V3 encodes 7 coefficients.

If the first alternative value in the example WU is selected by the watermark inserter in the Step 3, this block will be changed to the following quantized DCT coefficients:

| 12 | 34 | 0 | 2 | 0 | 0 | 0 | 0 |
| 87 | 0  | 0 | 0 | 0 | 0 | 0 | 0 |
| 16 | 0  | 1 | 0 | 0 | 0 | 0 | 0 |
| 0  | 0  | 0 | 0 | 0 | 0 | 0 | 0 |
| 0  | 0  | 0 | 0 | 0 | 0 | 0 | 0 |
| 0  | 0  | 0 | 0 | 0 | 0 | 0 | 0 |
| 0  | 0  | 0 | 0 | 0 | 0 | 0 | 0 |
| 0  | 0  | 0 | 0 | 0 | 0 | 0 | 0 |

Another example of encoded content is the content encoded with H.264 (MPEG4 Profile 10). There are some major differences in entropy coding between MPEG-2 and H264 including:

- H264 supports both CAVLC (Context-Adaptive Variable Length Coding) and CABAC (Context-Adaptive Binary Arithmetic Coding).
- Instead of 8×8 DCT block in MPEG2, H264 may also use 4×4 DCT block
- Unlike AVLC (Adaptive Variable Length Coding) in MPEG-2, CAVLC uses smaller VLC tables by coding levels and runs separately.
- Instead of the fixed VLC tables in MPEG-2, VLC tables can be switched according to the context information.

Because of the context-based entropy coding in H264, it is harder than MPEG-2 to predict its encoded value after a coefficient is modified. However, one may force a H264 encoder to reduce such context-based coding during encoding. For example, an encoder may use a fixed NumTrail table (e.g. NumTrail Table 0), instead of a NumTrail table based on certain properties of neighborhood blocks. Another example is to use a fixed length code xxxxyyy to encode the number of non-zero (NumCoeff) and the number of trailing ones (T1) for a 4×4 quantized DCT block where xxxx is for coding the number of non-zero (0-16) and yy is for coding the number of trailing ones (0 . . . 3). One can also force an encoder to use 4×4 block only. In the following example, some of the above rules are applied for encoding a 4×4 block.

1. A 4×4 qualitized DCT coefficients:

| 0 | 3  | -1 | 0 |
| 0 | -1 | 1  | 0 |
| 1 | 0  | 0  | 0 |
| 0 | 0  | 0  | 0 |

After zigzag scanning, the coefficients in this block: 0 3 0 1 -1 -1 0 1 0 . . . 0

2. CAVLC coding consists of the following five steps:

a. Encoding the number of non-zero (NumCoeff) and the number of trailing ones (T1): (5,3). The maximum number of T1 is limited to 3. These two numbers (NumCoef and T1) are coded into the bits "0001011" by using a 17×4 Huffman table (see below) (NumCoef: 0-16, T1: 0-3).

NumTrail 17×4 Huffman Table

| | T1 | | | |
|---|---|---|---|---|
| NumCoef | 0 | 1 | 2 | 3 |
| 0 | — | — | — | — |
| 1 | 000011 | 01 | — | — |
| ... | ... | ... | ... | ... |
| 5 | 0000000111 | 000001010 | 000000100 | 0001011 |
| ... | ... | ... | ... | ... |
| 16 | 0000000000000000 | 000000000000001001 | 0000000000000010001 | 0000000000000010000 | b. Encoding the signs of trailing ones in the reverse order, if any (0 for positive and 1 for negative): 0,1,1.

c. Encoding the remaining non-zero coefficients in reverse order: 1,3. The non-zero coefficients are encoded as "1" with Level VLC 0 table, and "0010" with Level VLC 1 table, respectively.

Level VLC 0 Table  Level VLC 1 Table

| Level | Code | Level | Code |
|---|---|---|---|
| 1  | 1      | 1  | 10   |
| -1 | 01     | -1 | 11   |
| 2  | 001    | 2  | 010  |
| -2 | 0001   | -2 | 011  |
| 3  | 00001  | 3  | 0010 |
| -3 | 000001 | -3 | 0011 |
| ... | ...   | ... | ... | d. Encoding total zeros (TotalZeros) from the beginning to the last non-zero coefficients. The maximum total zeros is 16-NumCoeff. If NumCoeff is 16, TotalZeros must be 0. If NumCoeff is 0, no further code is needed, i.e. the end of the coding for this block. For the remaining 15 cases, each case uses a Huffman table for coding TotalZeros (see TotalZero table). In this case, TotalZeros is 3, which is coded as "1110" with TotZeros table [NumCoeff=5].

| TotZeros table | | | | | | | |
|---|---|---|---|---|---|---|---|
| | NumCoef | | | | | | |
| TotZeros | 1 | 2 | 3 | 4 | 5 | 6 | ... 15 |
| 0 | 1 | 111 | 0010 | 111101 | 01000 | 101100 | ... ... |
| 1 | 011 | 101 | 1101 | 1110 | 01010 | 101101 | ... ... |
| 2 | 010 | 011 | 000 | 0110 | 01011 | 1010 | ... ... |
| 3 | 0011 | 001 | 010 | 1010 | 1110 | 001 | ... ... |
| ... | ... | ... | ... | ... | ... | ... | ... |
| 15 | 000000100 | — | — | — | — | — | ... ... | e. Coding the positions of all zeros from the beginning to the last non-zero coefficients. In this case, the positions of all zeros are coded to "001101".

The final encoded bits for this 4×4 block contain 25 bits: 0001011 | 011 | 10010 | 1110 | 001101. One example of alternative values is the encoded bits of an entire encoded 4×4 block. Another example of alternative value can be the bits coding signs of trailing ones as described in the above step c). In such a case, changing the alternative value only changes the sign of trailing ones and therefore does not change the total bit length of the encoded block.

Yet another example of encoded content is a JPEG2000 picture. Instead of DCT transforms, JPEG2000 uses Digital Wavelet Transform (DWT). The DWT of a pixeled image is computed by the successive application of vertical and horizontal, low-pass and high-pass filters to the image pixels, where the resulting values are called 'wavelet coefficients'. A wavelet is an oscillating waveform that persists for only one or a few cycles. At each iteration, the low-pass only filtered wavelet coefficients of the previous iteration are decimated, then go through a low-pass vertical filter and a high-pass vertical filter, and the results of this process are passed through a low-pass horizontal and a high-pass horizontal filter. The resulting set of coefficients is grouped in four 'subbands', namely the LL, LH, HL and HH subbands. Each iteration corresponds to a certain 'layer' or 'level' of coefficients. The first layer of coefficients corresponds to the highest resolution level of the image, while the last layer corresponds to the lowest resolution level. One example of alternative value for JPEG2000 encoded picture is the encoded LL subband at a specific layer (e.g. the lowest resolution).

A simple way to produce WUs is to use "trial and error" by performing the following steps for each WU:

a) For each entropy code (e.g. a VLC in MPEG2), randomly select a value as a candidate for an alternative value.

b) Determine if this candidate is a valid value by verifying the format compliance after substituting this candidate for the existing value. If not, go back to Step a).

c) Check the perceptual changes after exchanging the existing value with this candidate. If the perceptual change is acceptable, record this candidate as an alternative value for the WU. Otherwise, go back to Step a).

The above steps are repeated until all needed WUs are produced.

In one embodiment, WUs can be produced with an exiting watermarking system that works in transform domain. First with the selected watermarking system, produce two watermarked copies (A and B, both in encoded form) of an original encoded content with two different payload information: the first copy contains the watermark payload in which each bit is '1' and the other copy contains the watermark payload in which each bit is '0. The steps 1 and 2 (see FIG. 1) can be performed in the following manner to select and produce WUs by scanning A and B until the following conditions are satisfied:

(Location selection) P1a and P2a are the start position and end position of a plurality of consecutive encoded coefficients (their positions before entropy coding are noted as C) in the encoded content A, P1b and P2b are the start position and end position of the same encoded coefficients in the encoded content B, and (P2b-P2a) and (P1b-P1a) must be equal (and are equal to length L), and (Calculation of alternative values) Assume that at least one bit of watermark payload information is to be embedded in the encoded coefficients (in both A and B). Recording one watermark unit (P, L, C, V, V1, V2) in the following manner: P=P1a, L=P2a-P1a, V is not available in this case, V1 is the value from the position P1a to P2a in A, and V2 is the value from the position P1b to P2b in B.

To select N watermark units, repeat the second step above.

In an alternative embodiment, a bit of watermark payload is encoded as a relationship between two selected quantized coefficients in a middle frequency. By scanning the encoded content a watermark unit (P, L, C, V, V1, V2, ... Vn) can be located and determined with the following conditions:

V contains a plurality of consecutive encoded coefficients and there is at least one relationship (the kind/category of the relationships are predefined) between and/or among these coefficients. For example, if C1, C2 are two consecutive encoded coefficients and a relationship exists $C1 > C2+T$ where T is a threshold which may be used to adjust the strength of the relationship, which in turn determine the watermark robustness.

According to the perceptual model of the watermarking system, the coefficients can be modified to establish another relationship without perceptual change of the content. For example, C1 and C2 can be modified to C1' and C2' respectively so that a reverse relationship is formed, i.e. $C1' < C2'$. Recording the new value containing C1' and C2' as an alternative value Vi ($1 <= i <= n$). Repeat this step until all alternative values are found.

To select N watermark units, repeat the above steps. Ideally the first N watermark units containing the most coefficients are selected so that most relationships can be potentially established within each watermark unit. In the referenced watermarking system, one relationship may represent one bit of watermark payload therefore the watermark unit with most relationships may have the highest capability of embedding more bits of watermark payload.

In yet another example of a watermarking system, a bit of watermark payload is encoded as a relationship between property values of two sets of pixel values, or DCT/wavelet coefficients. Typical examples of properties include the average luminance, average color histogram distribution, or energy in certain frequency subband.

One principle of the present invention is to pre-process encoded content and generate alternative values containing watermarking signals. These alternative values will be later used to replace clearly defined parts of the encoded content. Although the existing watermarking systems can be applied to pre-processing (i.e. Step 1 and 2) and actual insertion (Step 3), new watermarking algorithms can be developed specially for this scheme.

Figure 3:
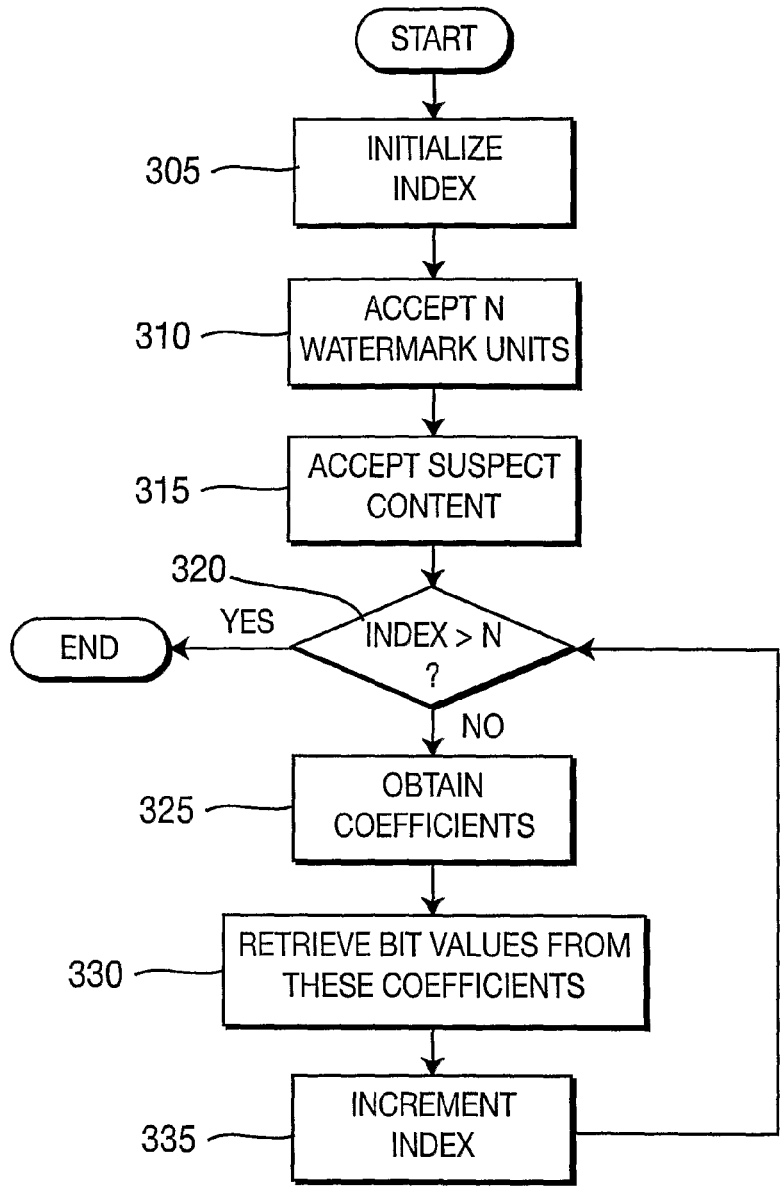
FIG. 3 is flowchart of the method of watermark detection in accordance with the principles of the present invention.

A simple and generic watermark detection method is to correlate the current coefficient in the watermarked content with the alternative values of a WU to find the alternative value having the best match to the current coefficient. To perform such correlation, the alternative values need to be decoded to coefficient values by using the corresponding entropy decoder. Each alternative value of a WU may contain a watermark signal, which corresponds to watermark payload information. By finding the matched alternative values in all WUs, the watermark payload information can be retrieved. Watermark detection can be performed at multiple levels. At the first level, P, L and C elements of WUs are required. Assume the number of WUs is N. For each WU, obtain the coefficient values according to the global coefficient indexes C. If the input content is baseband or encoded in other format than the format used in watermark embedding, transform the content first to the same encoded form as the watermark embedding. The raw watermark payload bits are retrieved by observing the relationships between and/or among the coefficients, or between property values of pixel values or coefficient values. FIG. 3 is a flowchart of the watermark detection process of the present invention. At 305 an index is initialized. 'N' watermark units are accepted/received at 310 and the suspect content is received at 315. The index is tested at 320 to determine if all watermarks have been processed/detected. If the index is greater than "N", the number of watermarks then the process is complete. If the index is not greater then "N" then the process proceeds to 325 where the coefficients are obtained. At 330 the bit values are retrieved according to the relationships between/among the coefficients. At 335 the index is incremented and the process proceeds to step 320.

If very weak relationships are retrieved from a WU, it would be helpful to access the other elements V and V1, V2, . . . Vn of the WU in order to provide additional information to determine the relationship. A relationship can be better determined by correlating the current coefficients with the coefficients encoded in V, V1, V2, . . . and Vn. The highest correlation value is the correlation indicating the closest match between the current coefficient and one of V, V1, V2, . . . Vn. That is, the highest correlation between the current coefficients and the coefficients encoded in Vi ($1 \leq i \leq n$) indicates a match. For suspect content with serious attacks, the original content may be required for further analysis and correlation.

Another way to use WUs for delivering copyrighted content is to use WUs to recover the corrupted content prior to playback. In such a case, the encoded content that is delivered to a playback/rendering device is explicitly corrupted either in the format/structure (invalid format) or in the content (degraded content). For a format-corrupted content, a decoder will not be able to decode it. If the corruptions are applied to the content, this content can be decoded and played but the corrupted portions of the content can have various visual artefacts such as noise, warning, and random patterns.

To produce a format-corrupted content, with a given watermark unit (P, L, V, V1, V2, . . . Vn), one can simply replace the L bits starting at P in the encoded content to be delivered with a random value. To further ensure that the random value indeed corrupts the format, one can simply exclude the random values, which are valid entropy codes. To introduce visual artefacts in the content or degraded content, select a valid alternative value, which is far from the original value V and all other alternative values V1, V2, . . . Vn, to the replace the current value in the encoded content. One exemplary use of corrupted format or degraded quality is to countermeasure a specific device or one category of devices that have been compromised or used for content piracy. These alternative values that cause corrupted format or degraded content are selected for substitution only for a specific watermark payload, which identifies the device or the category of devices.

Figure 4:
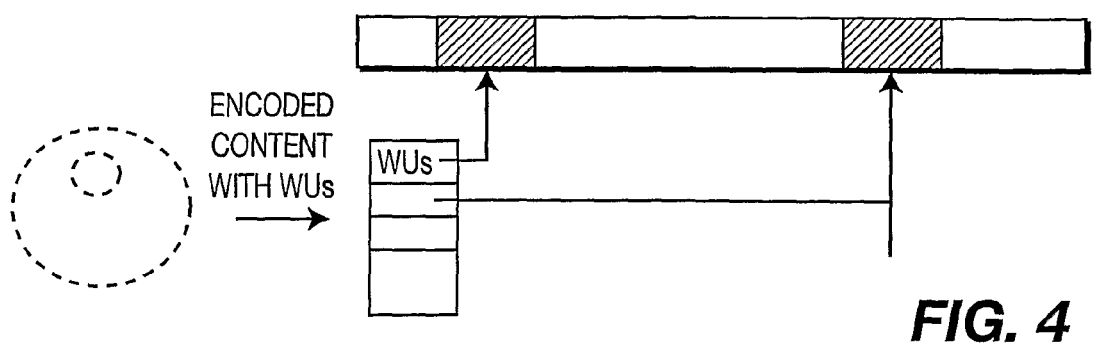
FIG. 4 is a block diagram of a playback device, which receives encoded content having watermark units embedded therein.

A watermark can be removed if WUs are known, by simply restoring the content to the original value V in each WU. To overwrite an existing watermark in the encoded content, one can simply select an appropriate value from V1, V2, . . . Vn in each WU according to the payload information to replace the value containing the existing watermark in the encoded content. A removable watermark is useful in some applications for supporting multi-generation watermarks. An example of multi-generation watermarks is to embed a forensic mark in each step of content post-production. To avoid accumulation of perceptual degradation potentially introduced by multiple watermarks, one may wish remove some or all previous watermarks before a new watermark is embedded. FIG. 4 shows an example of the watermark inserter in a playback device. The watermark inserter embeds a watermark by replacing some values/coefficients in the encoded content received by the devices with the alternative values specified in WUs. A replaceable watermark can also be useful for switching the states of copy protection for copyrighted content. For example, for a unit of content with a watermark information indicating "copy once", after one copy is made one may wish to change the watermark information from "copy once" to "no copy". There are several approaches to avoid any potential conflict of multiple watermarks (i.e. interfere between multiple watermarks). One approach is to use a unique subband for each generation of watermarks. Another approach is to select WUs with the positions that are different from the previous watermarks.

It is to be understood that the present invention may be implemented in various forms of hardware, software, firmware, special purpose processors, or a combination thereof. Preferably, the present invention is implemented as a combination of hardware and software. Moreover, the software is preferably implemented as an application program tangibly embodied on a program storage device. The application program may be uploaded to, and executed by, a machine comprising any suitable architecture. Preferably, the machine is implemented on a computer platform having hardware such as one or more central processing units (CPU), a random access memory (RAM), and input/output (I/O) interface(s). The computer platform also includes an operating system and microinstruction code. The various processes and functions described herein may either be part of the microinstruction code or part of the application program (or a combination thereof), which is executed via the operating system. In addition, various other peripheral devices may be connected to the computer platform such as an additional data storage device and a printing device.

It is to be further understood that, because some of the constituent system components and method steps depicted in the accompanying figures are preferably implemented in software, the actual connections between the system components (or the process steps) may differ depending upon the manner in which the present invention is programmed. Given the teachings herein, one of ordinary skill in the related art will be able to contemplate these and similar implementations or configurations of the present invention.

The invention claimed is:

1. A method for inserting a watermark in encoded content, said method comprising:
   receiving encoded content;
   receiving at least one pre-processed watermark unit; and
   replacing directly a number of bits starting at a position with an alternative value, wherein said alternative value has embedded therein watermark signals, wherein said alternative value is selected from among a plurality of alternative values specified in said at least one said watermark unit, wherein said position is specified in said at least one watermark unit.

2. The method according to claim 1, wherein said number of bits is specified in said at least one watermark unit.

3. A system for inserting a watermark in encoded content, comprising:
   means for receiving encoded content;
   means for receiving at least one pre-processed watermark unit; and
   means for replacing directly a number of bits starting at a position with an alternative value, wherein said alternative value has embedded therein watermark signals, wherein said alternative value is selected from among a plurality of alternative values specified in said at least one said watermark unit.

4. The system according to claim 3, wherein said number of bits is specified in said at least one watermark unit.

5. The system according to claim 3, wherein said system is a playback device, said playback device receiving encoded content and said at least one watermark unit, wherein said encoded content and said at least one watermark unit are one of stored as part of said encoded content, stored as metadata and stored in a directory.

6. A method for inserting a watermark in encoded content, said method comprising:
   receiving encoded content;
   receiving at least one pre-processed watermark unit;
   receiving a sequence of bits, wherein said sequence of bits comprises watermark payload information; and
   performing one of replacing directly a number of bits starting at a position with an alternative value and leaving unchanged said number of bits starting at said position based on bit values of said sequence of bits of said watermark payload information and wherein said alternative value has embedded therein watermark signals, wherein said alternative value is selected from among a plurality of alternative values specified in said at least one said watermark unit, wherein said position is specified in said at least one watermark unit.

7. A system for inserting a watermark in encoded content, comprising:
   means for receiving encoded content;
   means for receiving at least one pre-processed watermark unit;
   means for receiving a sequence of bits, wherein said sequence of bits comprises watermark payload information; and
   means for performing one of replacing directly a number of bits starting at a position with an alternative value and leaving unchanged said number of bits starting at said position based on bit values of said sequence of bits of said watermark payload information and wherein said alternative value has embedded therein watermark signals, wherein said alternative value is selected from among a plurality of alternative values specified in said at least one said watermark unit, wherein said position is specified in said at least one watermark unit.

8. A method for replacing a watermark in encoded content, said method comprising:
   receiving encoded content;
   receiving at least one pre-processed watermark unit; and
   replacing a number of bits starting at a position in said encoded content with a value, wherein said value is specified in said at least one watermark unit and further wherein said position is specified in said at least one watermark unit, wherein said value is an alternative value selected from among a plurality of alternative values specified in said watermark unit, wherein said selected alternative value forms a different watermark from that watermark which is being replaced, wherein said position is specified in said at least one watermark unit.

9. A system for replacing a watermark in encoded content, said system comprising:
   means for receiving encoded content;
   means for receiving at least one pre-processed watermark unit; and
   means for replacing a number of bits starting at a position in said encoded content with a value, wherein said value is specified in said at least one watermark unit, wherein said number of bits is specified in said at least one watermark unit and further wherein said position is specified in said at least one watermark unit, wherein said value is an alternative value selected from among a plurality of alternative values specified in said watermark unit, wherein said selected alternative value forms a different watermark from that watermark which is being replaced, wherein said position is specified in said at least one watermark unit.

10. A method for watermark detection, said method comprising:
    receiving at least one pre-processed watermark unit;
    receiving watermarked content;
    retrieving a plurality of coefficient values from the watermarked content; and
    retrieving bit values of said watermark from said coefficient values, wherein said bit values are retrieved by correlating a current coefficient to a plurality of coefficient values coded in said at least one watermark unit to determine a best match, wherein said bit values are retrieved from said plurality of coefficient values according to relationships between/among said coefficient values, wherein said relationships are weak and a current coefficient is correlated to determine a match from among said plurality of coefficient values coded in said at least one watermark unit.

11. A system for watermark detection, comprising:
    means for receiving at least one pre-processed watermark unit;
    means for receiving watermarked content;

means for retrieving a plurality of coefficient values from the watermarked content; and means for retrieving bit values of said watermark from said coefficient values, wherein said bit values are retrieved by correlating a current coefficient to a plurality of coefficient values coded in said at least one watermark unit to determine a best match, wherein said bit values are retrieved from said plurality of coefficient values according to relationships between/among said coefficient values, wherein said relationships are weak and a current coefficient is correlated to determine a match from among said plurality of coefficient values coded in said at least one watermark unit.

12. A method for generating watermark units, said method comprising:

selecting a position where a value in encoded content is to be replaced by an alternative value, wherein said position is specified in said at least one watermark unit; and calculating a plurality of alternative values for each selected position, wherein each of said alternative values contains a watermark signal, further wherein each of said alternative values has a same number of bits as said value that a selected one of said plurality of alternative value replaces, further wherein said replacement does not result in perceptual changes to said encoded content, further wherein said replacement does not result in non-compliant format of said encoded content and wherein said method is performed by a pre-processor.

13. An apparatus for generating watermark units, comprising:

means for selecting a position where a value in encoded content is to be replaced by an alternative value, wherein said position is specified in said at least one watermark unit; and means for calculating a plurality of alternative values for each selected position, wherein each of said alternative value contains a watermark signal, further wherein each of said alternative values has a same number of bits as said value that a selected one of said plurality of alternative values replaces, further wherein said replacement does not result in perceptual changes to said encoded content, further wherein said replacement does not result in non-compliant format of said encoded content and wherein said apparatus is a pre-processor.

14. The method according to claim 12, wherein said selected alternative value is an alternative value causing least perceptual change.

15. The apparatus according to claim 13, wherein said selected alternative value is an alternative value causing least perceptual change.

16. An apparatus, comprising:

means for storing encoded content; and
means for storing watermark units.

17. The apparatus according to claim 16, wherein said watermark units are encrypted.

18. The apparatus according to claim 16, wherein said watermark units are meta data of said encoded content.

19. The apparatus according to claim 16, wherein said watermark units are steganographic data hidden in one of syntax elements and said encoded content.

20. The apparatus according to claim 16, wherein access to said watermark units is controlled by a key.

21. The apparatus according to claim 16, wherein said watermark units are stored as a separate file.

22. The apparatus according to claim 16, wherein said apparatus is one of an optical disc, a tape, and a hard drive.

23. An apparatus, comprising:

means for transmitting encoded content; and
means for transmitting watermark units.

24. The apparatus according to claim 23, wherein said watermark units are encrypted.

25. The apparatus according to claim 23, wherein said watermark units are meta data of said encoded content.

26. The apparatus according to claim 23, wherein said watermark units are steganographic data hidden in one of syntax elements and said encoded content.

27. The apparatus according to claim 23, wherein access to said watermark units is controlled by a key.

28. The apparatus according to claim 23, wherein said watermark units are transmitted as a separate file multiplexed with said encoded content.

29. The apparatus according to claim 23, wherein said watermark units are encrypted and transmitted over a separate channel.

* * * * *